Aug. 11, 1931.  A. MOORHOUSE  1,818,001
MOTOR VEHICLE
Filed Nov. 6, 1925

Inventor
Alfred Moorhouse
By Milton Tibbetts
Attorney

Patented Aug. 11, 1931

1,818,001

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed November 6, 1925. Serial No. 67,228.

This invention relates to motor vehicles and particularly to means for supporting the fuel tank on the frame and for indicating the weight of the tank or the amount of fuel in the tank.

One of the objects of the invention is to provide a simple and inexpensive device on a motor vehicle for indicating the amount of gasoline in the tank.

Another object of the invention is to provide a support for a fuel tank that may be used to actuate a gauge that will indicate the weight of a tank and consequently the amount of fuel therein.

Another object of the invention is to provide such an indicating device which will not be affected by surges in the gasoline caused by movements of the vehicle, or other fluctuations in level in the tank, and which will not be affected by changes in temperature.

Other objects of the invention will appear from the following description taken in connection with the drawings, which forms a part of this specification, and in which.

Figures 1, 2, 3, 4:
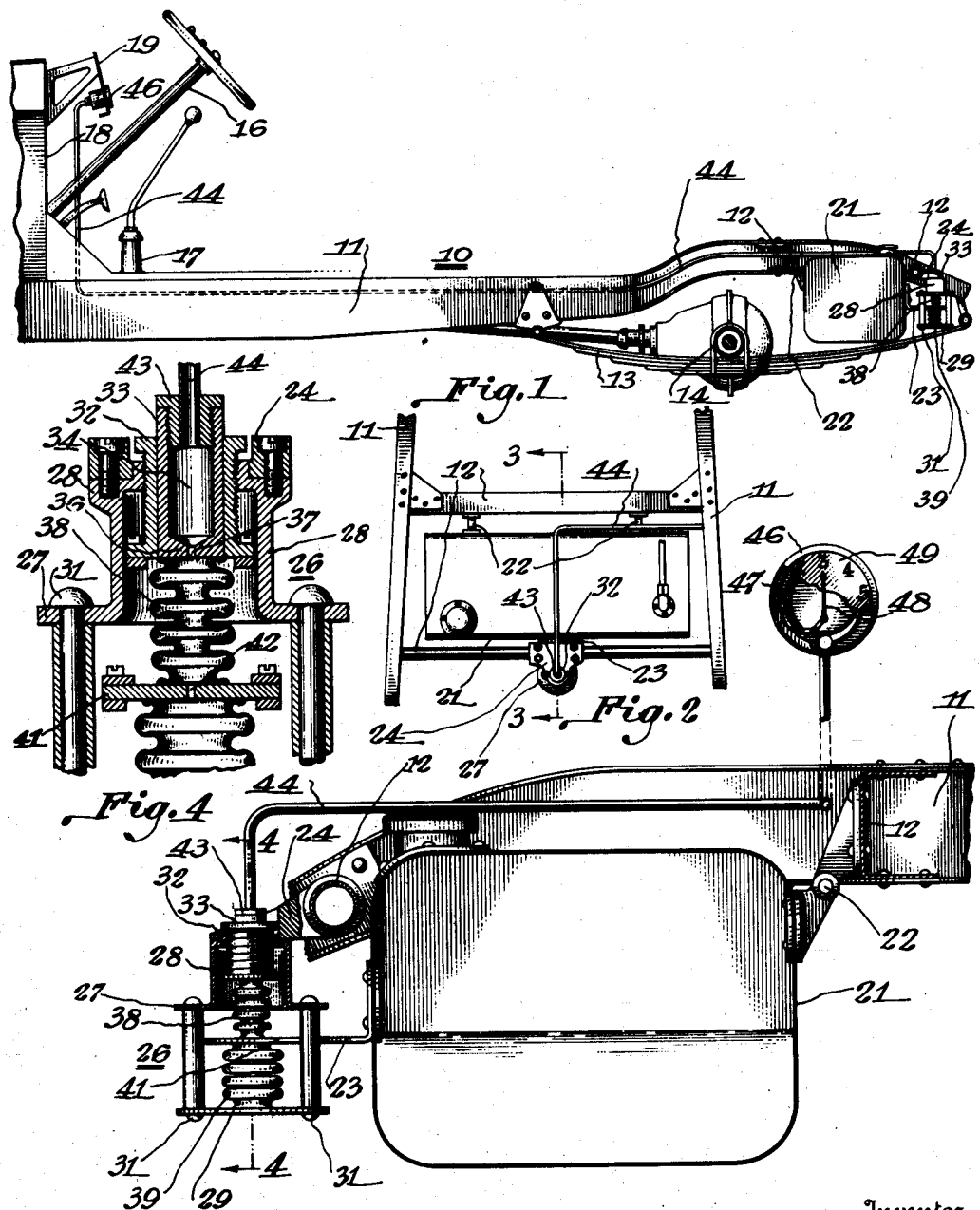
Fig. 1 is a view, partially in side elevation and partially in section, of a portion of a motor vehicle chassis showing the application of the invention thereto.
Fig. 2 is a plan view of the rear portion of the chassis shown in Fig. 1.
Fig. 3 is an enlarged side view of the rear end of the chassis frame, partially broken away and partially in section substantially on the line 3—3 of Fig. 2.
Fig. 4 is an enlarged detail section substantially on the line 4—4 of Fig. 3.

Referring to the drawings, at 10 is shown a portion of a motor vehicle chassis having a frame comprising side members 11 connected by cross members 12, which frame is supported by springs 13 from the vehicle axles 14 in the usual manner. The rear frame cross member 12 is preferably of tubular construction, the other cross members being of the usual channel section. Toward the forward end of the chassis, the vehicle is provided with appropriate steering apparatus 16 and controls 17, and is also usually equipped with a dash 18 from which is supported an instrument board 19, arranged in position in front of the vehicle driver and adapted to support various indicating instruments, one of which is the gauge of the fuel tank indicator provided in the present invention.

At the rear end of the chassis is a suitable tank 21 containing fuel, said tank and fuel constituting a load body arranged in the usual way between the side frame members 11 and the two rear cross members 12, which tank is preferably hinged or otherwise pivotally supported at its forward end to the rear channel cross member as indicated at 22. The weight of the tank 21 and of the fuel therein therefore tends to turn the tank about the pivot pins 22 as will be evident. The other side of the tank 21 is provided with a rearwardly extending arm 23.

Clamped to or otherwise supported on the tubular cross member 12, as for example by a bracket 24, is a hydrostatic pressure device 26, which is mounted in a support 27 having a reduced upper portion or neck 28 and a removable bottom plate 29 secured to the support in any convenient manner as by means of the bolts 31. The neck 28 is adapted to support a removable bushing 32 which may be adjustably mounted therein as clearly indicated in Fig. 4, and within this bushing is supported a cylinder 33 forming an expansion chamber 34 and provided with an integral bottom plate 36. The plate 36 is provided, axially of the cylinder, with an orifice 37 having a bore of relatively small diameter.

Between the plates 29 and 36, within the support 27, is arranged a pair of collapsible pressure chambers 38 and 39, which are preferably of the metal bellows or sylphon type and which are disposed in series, end to end. These chambers are of different capacities, the upper chamber 38 being of smaller volume than the lower chamber 39, and they are separated by a plate or closure 41 to which each of them is attached. This plate is provided with an aperture or orifice 42 of a diameter comparable to that of the orifice 37 and which communicates with each of the chambers. The plate 41 is rigidly connected to the arm 23 of the fuel tank in any convenient manner, so as to partake of up and down motion of the tank.

The upper end of the cylinder 34 is closed by a suitable plug 43, communicating with a pipe 44 which extends to any convenient point on the vehicle but preferably to the instrument board 19, as clearly indicated in Fig. 1. This pipe 44 terminates in a pressure gauge 46 which may be of any suitable construction but which is preferably of the Bourdon type in which a curved flexible tube 47 is adapted to be straightened by fluid pressure to which it is subjected; the resulting movement being indicated by a pointer 48 connected to the tube 47 and playing over a suitable scale 49. The gauge 46 closes the end of the pipe 44 and is adapted to indicate in any suitable units the hydrostatic pressure developed therein.

The system comprising the device of this invention, including the two chambers 38 and 39, and the expansion chamber 34, is completely filled with some inexpansible fluid, such as oil, and the pipe line 44 and the gauge are filled with some fluid having a low freezing point, for example alcohol. In the operation of the device a force, corresponding to the weight of the tank 21 and the gasoline contained therein, is exerted upon the flexible bellows by the arm 23 to compress the lower chamber 39 and elongate the upper chamber 38. Since the lower chamber is of greater capacity than the upper chamber, a movement of fluid takes place through the aperture 42 until the pressure of the fluid in these chambers is balanced. This pressure is also communicated through the orifice 37 to the fluid in the expansion chamber 34, thence to the liquid or gas contained in the conduit 44 and the flexible tube 47 of the gauge 46. Accordingly, a corresponding movement of the pointer 48 is produced in a manner well understood. The scale 49 may be calibrated to read directly in gallons of gasoline or in any other convenient unit, so that the position of the pointer 48 thereon will directly indicate the amount of fuel in the tank 21. It is the reaction of this pressure acting through the arm 23, which supports the weight of the tank.

Any sudden change of pressure in the chambers 38 and 39, such as would be caused by surging of fuel in the tank, or violent motion of the tank as the vehicle travels over rough road, will not, however, be communicated through the pipe 44 to the gauge 46, since such sudden changes in the pressure will be effectively throttled and damped out because of the small coupling afforded between the chambers 34 and 39, and by the orifices 37 and 42. For example a sudden upward movement of the tank 21 about its pivotal support 22 will tend to effect an elongation of the lower chamber 39 and a corresponding contraction of the upper chamber 38, causing a decrease of pressure in the lower chamber and an increase of pressure in the upper chamber. This increase of pressure in the upper chamber will not be rapidly communicated to the column of fluid in the expansion chamber 34 by reason of the resistance of the orifice 37, but it will be more rapidly communicated to the lower chamber 39 through the orifice 42 because of the drop of pressure in the lower chamber. Sudden changes in pressure caused by such movements of the tank will not, therefore, be communicated to the gauge 46 and cause fluctuations of the needle 48. On the other hand a gradual increase of pressure, such as would obtain during filling of the tank 21, will be readily communicated through the apertures to the gauge.

It will also be apparent that changes in temperature of the system, causing an expansion of the fluid in the chambers 38 and 39 and the pipe line 44, while they cause a change in the volume of the contents of the system do not cause a change in the pressure therein. Such an increase in volume as would be caused by a rise in temperature of the system, would simply mean that the chambers 38 and 39 would be expanded, and the tank 21 would be carried at a slightly higher lever, the reading on the gauge 46 not being affected in any way.

It will be understood that various forms of the invention other than those described above may be used without departing from the spirit or scope of the invention.

Having thus described the invention, what is claimed and desired to be secured by Letters Patent is:

1. In a motor vehicle having a supporting frame and a fuel tank, the combination of a hydrostatic pressure responsive device comprising expansible chambers of different capacities, a plate between the chambers having an aperture connecting the chambers, said device being connected between the frame and the tank, pressure transmitting means connected to one of the chambers at one end, and a remote indicating means connected to the other end of the transmitting means.

2. In a motor vehicle having a supporting frame and a fuel tank mounted to move thereon in response to gravity, the combination of a hydrostatic pressure responsive device between said frame and said tank including a plate adapted to move with the tank and having an aperture therein, expansible chambers of different capacities supported by the frame and connected by said aperture, the smaller chamber being adapted to be compressed upon upward movement of the tank and the larger chamber upon downward movement thereof, an expansion chamber secured to the frame and connected to said smaller chamber by an aperture in the wall thereof, a pressure responsive gauge, and means connecting the gauge and the expansion chamber.

3. In a motor vehicle having a supporting frame and a fuel tank, the combination of a device for indicating the amount of fuel in the tank comprising a hydrostatic pressure system having opposed collapsible chambers of different capacities connected by a restricted orifice and supported from the frame, a connection between the tank and the juncture of the chambers, a gauge connected to one of the chambers through another restricted orifice, and fluid under pressure in the system.

4. In combination, a motor vehicle including a frame and a tank mounted at one side on the frame to move in response to gravity, a support secured to said frame, collapsible chambers of unequal volume mounted in series in said support and secured thereto at their outer ends, a plate between said chambers secured to the inner ends thereof and connected to the fuel tank to move therewith with respect to the support, said plate having an orifice communicating with both chambers, a pipe having an expansion chamber connected by an orifice to the upper chamber, and a pressure gauge mounted on the vehicle connected to said pipe.

5. A device for indicating the amount of fuel in the tank of a motor vehicle at a point on said vehicle removed from the tank, comprising a fluid pressure device including coaxial flexible chambers adapted to transform the weight of the tank and fuel into fluid pressure, a flow resisting device between said chambers, a pipe connected to one of the chambers, a second flow resisting device between the pipe and said chamber, and a pressure responsive gauge connected to said pipe.

6. In combination with a motor vehicle including a tank, a fluid pressure device for indicating the amount of fuel in the tank at a point on said vehicle removed from the tank, comprising means connected to said tank to convert the weight of the tank and contents to fluid pressure, means to transmit said pressure, a pressure indicating device operable by said pressure and connected to the transmitting means, and throttling devices associated with said first named means to check surges in the pressure fluid in said means.

7. In a motor vehicle having a frame and a tank supported on the frame to move with respect thereto, a fluid pressure device for indicating the amount of fuel in the tank at the dash of the vehicle comprising means arranged between the tank and the vehicle to support the tank and to convert the weight of the tank and contents into fluid pressure, means including throttling devices for said fluid to prevent sudden movements of the tank from creating surges of pressure in the devices, a pipe connected to said first mentioned means extending to the vehicle dash, and a pressure indicating gauge on said dash connected to the end of the pipe to close the device, said gauge being responsive to fluid pressure changes therein.

8. In a motor vehicle, a tank, means arranged between said tank and the vehicle to support the tank and to convert the weight of the tank and contents into fluid pressure, said means having pressure chambers of different capacity, a throttling device between the chambers adapted to prevent surges of pressure therebetween, pressure indicating means connected to one of said chambers, and throttling means between the chamber and said indicating means.

9. In combination with an indicating device, a fuel tank movable about a horizontally offset axis, opposed pressure chambers connected by an orifice and adapted to be actuated by movement of the tank, an expansion chamber connected to one of said pressure chambers by an orifice, and means including an extended conduit for indicating the pressure in the device connected to said expansion chamber.

10. In a motor vehicle a tank and a dash, a fluid pressure indicating device, said device including a pressure gauge mounted on said dash, means arranged between said tank and the vehicle to support the tank and to convert the weight of the tank and contents into fluid pressure, said means having pressure chambers of different capacity adapted to prevent an increase in fluid pressure at said gauge when the temperature of the fuel varies, and means connecting said gauge to one of said chambers.

11. In combination in an indicating system, a support, a pair of extensible and contractable chambers of different capacities, each of said chambers having one end fixed to said support and the other end movable, said movable ends having a common closure provided with a restricted orifice affording a connection between the chambers.

12. In combination, a support subjected to vibration, a vessel pivoted at one side to said support, an arm on said vessel adapted to move therewith, and means engaging said arm comprising flexible chambers connected by a restricted orifice and having liquid under pressure therein to dampen vibration of said vessel.

In testimony whereof I affix my signature.
ALFRED MOORHOUSE.